(No Model.)  2 Sheets—Sheet 1.
G. B. SNOW.
DENTAL VULCANIZING APPARATUS.
No. 465,735.  Patented Dec. 22, 1891.
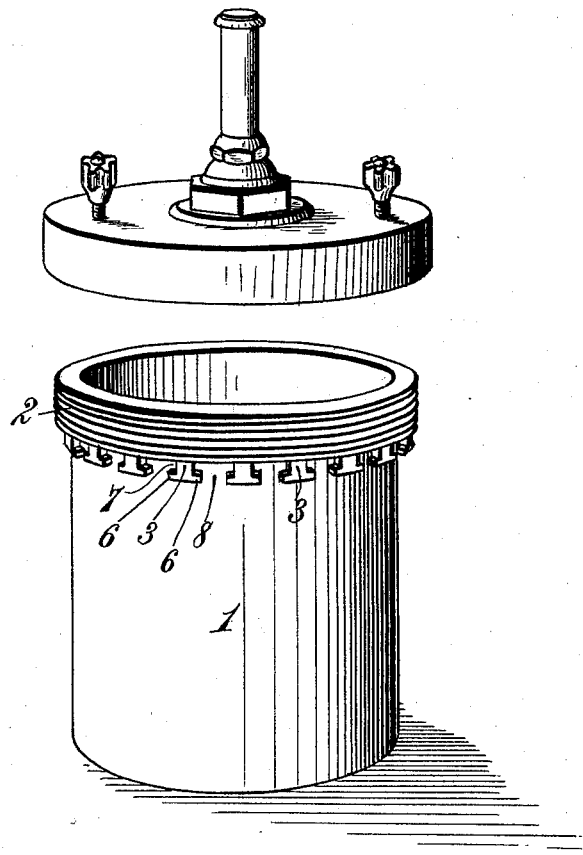
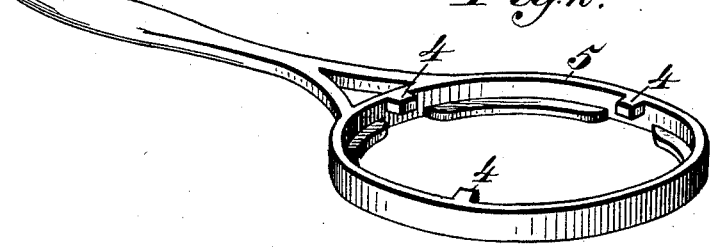
Witnesses.
Robert Emmett.
J. A. Rutherford.
Inventor.
George B. Snow.
By James L. Norris,
Atty.

(No Model.) 2 Sheets—Sheet 2.

G. B. SNOW.
DENTAL VULCANIZING APPARATUS.

No. 465,735. Patented Dec. 22, 1891.

Witnesses. Inventor.
Robert Everett, George B. Snow,
J. A. Rutherford. By James L. Norris,
Atty.

UNITED STATES PATENT OFFICE.

GEORGE B. SNOW, OF BUFFALO, NEW YORK.

DENTAL VULCANIZING APPARATUS.

SPECIFICATION forming part of Letters Patent No. 465,735, dated December 22, 1891.

Application filed September 16, 1891. Serial No. 405,905. (No model.)

*To all whom it may concern:*

Be it known that I, GEORGE B. SNOW, a citizen of the United States, residing at Buffalo, in the county of Erie and State of New York, have invented new and useful Improvements in Dental Vulcanizing Apparatus, of which the following is a specification.

In dental vulcanizing apparatus comprising a pot and a screw-cover adapted to be screwed and unscrewed for closing and opening the pot the latter is usually formed on its exterior with a rim having an annular gang of lugs separated from each other for receiving between them the spurs or projections on a circular or ring wrench, by which the pot is turned or held for the purpose of screwing or unscrewing the cover. The prior construction is objectionable, in that the adjacent edges of the lugs become worn and the wrench fails to properly hold, in consequence of which it frequently slips unless handled with great care.

The objects of my invention are to improve the prior construction, to prevent the wrench slipping while screwing or unscrewing the cover, and to provide novel means whereby the wrench locks itself in engagement with the lugs of the pot in such manner as to rotate or hold the latter, while being susceptible of convenient removal and replacement, as occasion may demand.

To such ends the invention consists in the combination, with the cover of a dental vulcanizer, of a pot having a gang of lugs constructed with lateral shoulders, forming locking-notches to interlock with the spurs of a wrench, whereby the wrench locks itself to the pot to rotate or hold the latter.

The invention is illustrated by the accompanying drawings, in which—

Figure 3:
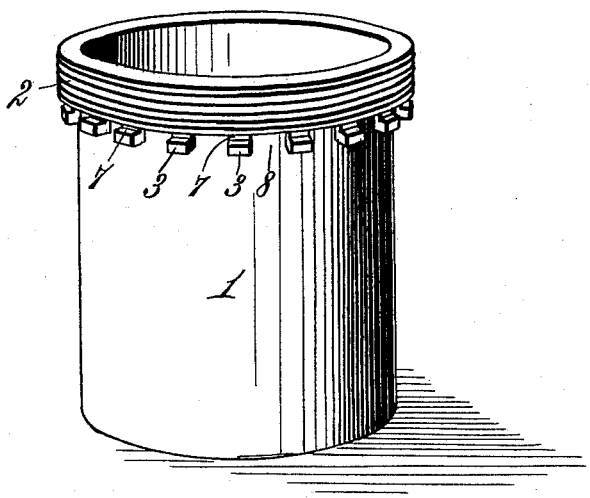
Figure 4:
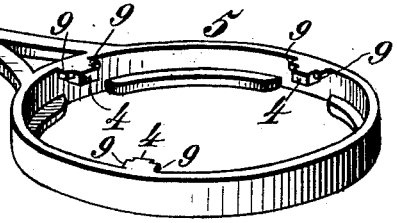

Figure 1 is a perspective view of a vulcanizer, showing the cover detached from the pot. Fig. 2 is a detail perspective view of the circular or ring wrench. Fig. 3 is a perspective view of a vulcanizer-pot, showing a modification of my invention; and Fig. 4 is a perspective view of a wrench adapted for the modified construction.

In order to enable those skilled in the art to make and use my invention, I will now describe the same in detail, referring to the drawings, wherein—

The numeral 1 indicates a vulcanizer-pot having at its upper end a screw-threaded rim 2, which is formed at its lower portion with an annular gang of lugs 3, separated from each other to provide intervening spaces for the reception of the spurs 4 on the circular or ring wrench 5. Each lug 3 has formed upon its opposite edges and at the lower portion thereof laterally-projecting shoulders 6 for the purpose of forming locking-notches 7 to receive and interlock with the spurs 4 of the circular or ring wrench 5. The two projecting shoulders 6 of each lug 3 extend in opposite directions, and consequently a space is formed between each pair of lugs, and the entering mouth 8 to this space is of considerably less dimension than the main body of the space. The shape of the shoulders 6 and the form or configuration of the notches 7 may be variously modified without departing from the spirit of my invention, the essential feature of which is to provide the opposite edges of the lugs 3 with locking-notches of suitable construction to interlock with the spurs of the wrench in such manner that when the spurs of the wrench are inserted through the mouths 8 and the wrench slightly turned or rotated the spurs will pass into engagement with the locking-notches 7 and be supported by the laterally-projecting shoulders 6. By this means the wrench fulfills all the conditions required to hold or rotate the pot for the purpose of screwing it into or out of engagement with the screw-cover 9.

In the modified construction, Fig. 3, the locking-notches 7 are formed in the outer sides of the lugs 3 at a point directly at the base of the screw-threaded rim 2.

The wrench 5, Fig. 4, adapted for the modified construction, is formed with spurs 4, having at each side a projection 9, so that when the spurs are introduced through the mouths 8 of the spaces between the lugs 3 and the wrench is turned the projections 9 enter into the notches 7 for the purpose of locking the wrench to the pot. The screw-cover is of ordinary construction and provided with the usual attachments of a dental vulcanizing apparatus, and therefore requires no detail description. The construction described and shown is such as to entirely prevent the wrench from slipping, and since it locks itself to the pot the wrench will be supported thereupon, while being susceptible of convenient removal and replacement whenever desired.

In ordinary vulcanizing apparatus it is necessary to frequently replace the pot-rims, owing to undue wearing of the lugs; but by my improved construction the renewal of the pot-rims is avoided, since the wrench locks itself to the pot and is not liable to slip at any time.

Having thus described my invention, what I claim is—

The combination, with the screw-threaded cover of a dental vulcanizer, of a pot having a screw-threaded rim and a gang of lugs constructed with lateral shoulders, forming locking-notches to interlock with the spurs of a wrench, whereby the wrench locks itself to the pot, substantially as and for the purposes described.

In testimony whereof I have hereunto set my hand and affixed my seal in presence of two subscribing witnesses.

GEORGE B. SNOW. [L. S.]

Witnesses:
 THOS. A. RUSSELL,
 CHARLES E. CLARK.